2,957,850
Patented Oct. 25, 1960

2,957,850

PHENOL SALTS OF POLYESTERAMINES AND THEIR USE AS FUNGICIDES OR RODENT REPELLENTS

James L. Jezl, Swarthmore, Pa., assignor to Sun Oil Company, Philadelphia, Pa., a corporation of New Jersey No Drawing. Filed Aug. 2, 1955, Ser. No. 526,079

5 Claims. (Cl. 260—47)

This invention relates to new compositions of matter having fungicidal and other beneficial properties.

The compositions according to the invention are phenol salts of polyesteramines, the latter being such as may be obtained by reaction of a polybasic acid or anhydride thereof with a polyhydroxy amine such as a dihydroxy tertiary amine, i.e. an amine wherein the nitrogen atom is attached to three radicals other than hydrogen and which contains two hydroxyl groups per molecule. Thus, for example, ethyl diethanolamine

can be reacted with a dibasic acid HOOCRCOOH to give a polyesteramine having the structural unit

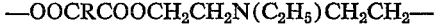

one molecule of water being evolved upon the formation of each ester group in the chain.

The general structural unit of the polyesteramine employed according to the invention is the following:

where R is a hydrocarbon radical selected from the group consisting of alkylene radicals and arylene radicals and having not more than 10 carbon atoms, where $m$ and $n$ are integers from 2 to 4, and where R' is a monovalent radical selected from the group consisting of alkyl radicals having 1 to 4 carbon atoms, hydroxyalkyl radicals having 1 to 4 carbon atoms, and esterification products of such hydroxyalkyl radicals with a monocarboxylic acid selected from the group consisting of naturally occurring fatty acids, rosin acids, and naphthenic acids.

In instances where R' is an ester of a hydroxyalkyl radical, the monocarboxylic acid can be reacted with the alkanolamine either prior to or during the reaction of the alkanolamine with the dibasic acid to form the polyesteramine. Thus, triethanolamine mononaphthenate, for example, can be prepared and subsequently reacted with phthalic anhydride to form a polyesteramine, or triethanolamine, naphthenic acid, and phthalic anhydride can be simultaneously reacted to produce a polyesteramine similar to that obtained in the other preparation.

The preparation of polyesteramines is known in the art, and can be performed according to any of the known methods. The polymerization should be terminated before the polymer becomes infusible. Determination of suitable polymerization procedure is within the ability of a person skilled in the art in the light of the present specification.

According to the present invention, a polyesteramine is reacted with a phenol to produce a material wherein one or more nitrogen atoms of the polyesteramine molecule is neutralized with the phenol. Preferably, the amount of the phenol used is sufficient to neutralize substantially all of the nitrogen atoms of the polyesteramine molecule. Thus, for example, if the polyesteramine contains an average of $x$ structural units per molecule, $x$ mole equivalents of the phenol are preferably used per mole of the polyesteramine.

Salt-forming phenols generally are suitable for preparation of the compounds according to the invention. Such phenols are considered to include, for the purposes of the present invention, both monocyclic and polycyclic aromatic compounds having at least one hydroxyl group directly attached to an aromatic nucleus. Monohydric phenols are preferred, but salt-forming polyhydric phenols can also be used. Monocyclic phenols are preferred, but salt-forming polycyclic phenols, such as naphthols, can be used. Examples of suitable phenols are the following: phenol itself; halogenated phenols such as pentachlorophenol, o-chlorophenol, m-chlorophenol, p-bromophenol, 2-bromo-4-phenylphenol, 2,4,6-trichlorophenol, 2,4,6-tribromophenol, 2,2'-dihydroxy-5,5'-dichlorodiphenyl methane; 2,2'-dihydroxy-3,5,6,3',5',6'-hexachlorodiphenyl methane; hydrocarbon-substituted phenols such as o-cresol, m-cresol, p-cresol, anol, eugenol, isoeugenol, carvacrol, thymol, o-cyclohexylphenol, p-cyclohexylphenol, o-hydroxydiphenyl, p-hydroxydiphenyl; nitrated phenols such as o-nitrophenol, p-nitrophenol, 2,4-dinitrophenol, picric acid; other substituted phenols such as guaiacol, o-hydroxy-acetophenone, p-hydroxyacetophenone; alphanaphthol, betanaphthol; catechol, resorcinol, hydroquinone, pyrogallol, phloroglucinol, etc.

In one embodiment of the invention, the compositions are quaternary phenol salts of the nitrogen atoms in the polyesteramine molecule. Such salts may be prepared, for example, by reacting the polyesteramine with an addition agent, e.g. hexadecyl bromide, to form a quaternary halide, and reacting the latter with an alkali metal phenate to form the desired quaternary phenate.

The compounds of the invention are useful as fungicides, bactericides, rodent repellents, insecticides, seed preservatives, wood, paper, cordage, leather and fabric preservatives, etc. They may be used as fungicides, for example by impregnating a textile material with a hydrocarbon solution of the composition, whereby the textile material is rendered resistant to attack by fungi under circumstances that would ordinarily produce severe attack.

The compounds can be used as constituents of paints and other protective coatings, plastic or rubber coating or film forming materials, paraffin and microcrystalline wax compositions, etc. They can be used in aqueous compositions containing a dispersing agent, or in organic solvent compositions. They can be incorporated in dusting compositions for the protection of stored goods, comprising a dry porous diluent, e.g. clay, talc, etc.

Suitable polyesteramines for use according to the invention include, in addition to the linear polymers referred to previously, polydimensional polyesteramines such as can be prepared by polymerizing a polybasic acid and an aminoalkanol, the total number of carboxyl groups and hydroxyl groups in the two molecules being greater than 4. Thus, for example triethanolamine and a dibasic acid can be reacted to form a polydimensional polyesteramine which can then be reacted with a phenol according to the invention. The nature of the reactants employed can be generally the same as that described with regard to linear polyesteramines, with the exception that the polybasic acid contains more than two carboxyl groups and/or the aminoalkanol contains more than two hydroxyl groups. The known procedures for preparation of polydimensional polyesteramines can be used, care being taken to avoid the formation of infusible polymers.

The following example illustrates the invention:

*Example I*

Triethanolamine was reacted with adipic acid to form a polyesteramine and the latter reacted with pentachlorophenol to produce a composition wherein nitrogen atoms of the polyesteramine were neutralized with pentachlorophenol.

The preparation of the polyesteramine was as follows: triethanolamine was admixed with 1.5 moles of adipic acid per mole of triethanolamine and about 2 cc. of toluene per gram of triethanolamine. The resulting mixture was heated to the boiling point with reflux of condensate, water being trapped from the condensate prior to refluxing. The heating was continued until about 1.35 moles of water per mole of triethanolamine had been evolved. Toluene was stripped from the product to obtain the polyesteramine as residue.

The preparation of the pentachlorophenol salt was as follows: the polyesteramine was heated to about 100° C. to effect fusion thereof, and 0.85 part by weight of pentachlorophenol per part of polyesteramine were added with stirring. A homogeneous liquid product was obtained. Upon cooling to 60–65° C., the product stiffened and became a plastic, unpourable material at that temperature and lower temperatures including room temperature. The product is soluble at room temperature in equal volume mixtures of acetone and methanol, to produce solutions of at least two percent concentration.

The product was tested as a fungicide by impregnating a 4″ x 7″ panel of bleached muslin with a two percent solution of the product in an equal volume mixture of acetone and methanol, then burying the panel for 15 days in mushroom-clay mixed soil. At the end of the test, the panel was completely intact and contained only slight fungous growth on a small portion of the panel, whereas a control panel which had not been impregnated with fungicide was essentially completely disintegrated at the end of the test.

This example shows that a polyesteramine prepared from triethanolamine and adipic acid can be reacted with pentachlorophenol to obtain a salt product having highly beneficial properties as a fungicide.

The invention claimed is:

1. Process for preparing a fungicide which comprises contacting a fungicidal halophenol with a polyesteramine obtained by reacting, in proportions to obtain a polyesteramine, an alkanolamine having the formula $$HOC_nH_{2n}NR'C_mH_{2m}OH$$

where $m$ and $n$ are integers from 2 to 4, and where $R'$ is a monovalent radical selected from the group consisting of alkyl radicals having 1 to 4 carbon atoms, hydroxyalkyl radicals having 1 to 4 carbon atoms, and esterification products of said hydroxyalkyl radicals with a monocarboxylic acid selected from the group consisting of naturally occurring fatty acids, rosin acids, and naphthenic acids, with a compound having the formula HOOCRCOOH where R is selected from the group consisting of alkylene and arylene radicals having not more than 10 carbon atoms, heating the resulting mixture to evolve at least about 1.35 moles of water per mole of alkanolamine and to avoid the formation of infusible polymers, the amount of halophenol being sufficient to neutralize at least one nitrogen atom of the polyesteramine molecule.

2. Process according to claim 1 wherein said alkanolamine is triethanolamine, said compound is adipic acid and the amount of adipic acid is about 1.5 moles per mole of triethanolamine.

3. Process for protecting textile material from attack from fungi which comprises contacting textile material with a solution in a polar organic solvent of a fungicidal halophenol salt of a polyesteramine obtained by reacting, in proportions to obtain a polyesteramine, an alkanolamine having the formula $HOC_nH_{2n}NR'C_mH_{2m}OH$ where $m$ and $n$ are integers from 2 to 4, and where $R'$ is a monovalent radical selected from the group consisting of alkayl radicals having 1 to 4 carbon atoms, hydroxyalkyl radicals having 1 to 4 carbon atoms, and esterification products of said hydroxyalkyl radicals with a monocarboxylic acid selected from the group consisting of naturally occurring fatty acids, rosin acids, and naphthenic acids, with a compound having the formula HOOCRCOOH where R is selected from the group consisting of alkylene and arylene radicals having not more than 10 carbon atoms, heating the resulting mixture to evolve at least about 1.35 moles of water per mole of alkanolamine and to avoid the formation of infusible polymers, the amount of halophenol being sufficient to neutralize at least one nitrogen atom of the polyesteramine molecule.

4. As a new composition of matter, a fungicidal halophenol salt of a polyesteramine obtained by reacting, in proportions to obtain a polyesteramine, an alkanolamine having the formula $HOC_nH_{2n}NR'C_mH_{2m}OH$ where $m$ and $n$ are integers from 2 to 4, and where $R'$ is a monovalent radical selected from the group consisting of alkyl radicals having 1 to 4 carbon atoms, hydroxyalkyl radicals having 1 to 4 carbon atoms, and esterification products of said hydroxyalkyl radicals with a monocarboxylic acid selected from the group consisting of naturally occurring fatty acids, rosin acids, and naphthenic acids, with a compound having the formula HOOCRCOOH where R is selected from the group consisting of alkylene and arylene radicals having not more than 10 carbon atoms, heating the resulting mixture to evolve at least about 1.35 moles of water per mole of alkanolamine and to avoid the formation of infusible polymers, the amount of halophenol being sufficient to neutralize at least one nitrogen atom of the polyesteramine molecule.

5. Composition according to claim 4 wherein said halophenol is pentachlorophenol, and the amount of pentachlorophenol is sufficient to neutralize substantially all of the nitrogen atoms of the polyesteramine molecule.

References Cited in the file of this patent

UNITED STATES PATENTS

| 1,918,222 | Weisberg et al. | July 11, 1933 |
| 2,106,522 | Ellis | Jan. 25, 1938 |
| 2,513,429 | Rosher | July 4, 1950 |

FOREIGN PATENTS

| 493,442 | Great Britain | Oct. 3, 1938 |
| 499,491 | Great Britain | Jan. 17, 1939 |